United States Patent [19]
Chacon, Sr.

[11] Patent Number: 5,820,119
[45] Date of Patent: Oct. 13, 1998

[54] WINDOW RETAINING APPARATUS

[76] Inventor: Joe M. Chacon, Sr., 709 E. Oak St., Winslow, Ariz. 86047

[21] Appl. No.: 634,869

[22] Filed: Apr. 19, 1996

[51] Int. Cl.$^6$ .................................................. B25B 1/20
[52] U.S. Cl. ............................... 269/37; 269/20; 269/69; 269/243
[58] Field of Search ................. 269/20, 21, 69, 269/70, 37, 41, 43, 243, 904; 294/64.1, 65; 248/362, 206.2, 206.3

[56] References Cited

U.S. PATENT DOCUMENTS

| | | | |
|---|---|---|---|
| 2,783,367 | 2/1957 | Locke | 248/362 |
| 2,846,761 | 8/1958 | Evans | 269/69 |
| 4,497,476 | 2/1985 | Wiele | 269/21 |
| 4,828,303 | 5/1989 | Soria | 248/206.3 |
| 5,016,850 | 5/1991 | Plahn | 248/206.3 |

*Primary Examiner*—Robert C. Watson
*Attorney, Agent, or Firm*—James A. Hudak

[57] ABSTRACT

Apparatus is disclosed for retaining the rear window of a truck in place within its window frame while the urethane seal therebetween is curing. The overall length of the apparatus is adjustable and suction cups are attachable in a spaced-apart relationship to the central portion thereof to grippingly engage the window and hold same in place during the curing process. An adjustable tie-down clamp is received through each of the opposite ends of the apparatus and engages either a window frame in the truck cab or the truck door frame.

2 Claims, 1 Drawing Sheet

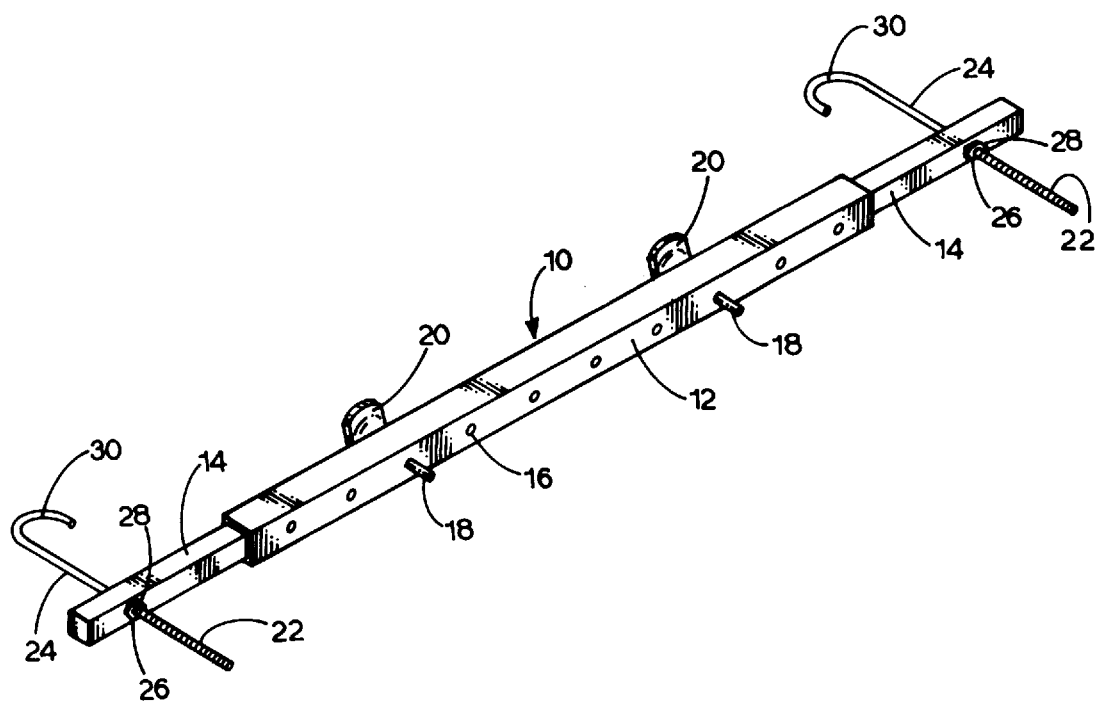

WINDOW RETAINING APPARATUS

TECHNICAL FIELD

The present invention relates, in general, to apparatus to assist in the installation of the rear window in a truck, and, more particularly, to apparatus which grippingly engages the rear window and compresses same against the window frame in a truck while the urethane seal therebetween is curing.

BACKGROUND ART

When the rear window in a truck requires replacing, the new window must be physically held in place against the window frame while the urethane seal therebetween is curing. The curing process typically requires twenty to thirty minutes to complete. Depending upon the size of the window involved, two men may be required to hold the window in place during the curing process. Thus, the replacement of the window is a labor intensive, time consuming process.

In view of the foregoing, it has become desirable to develop apparatus to grippingly retain the window in place and compress same against the window frame while the urethane seal therebetween is curing.

THE INVENTION

The present invention solves the problems associated with the prior art approach for holding a new window in place against the window frame while the urethane seal therebetween is curing, and other problems, by providing adjustable apparatus to grippingly engage the window and to compressingly hold same in place against the window frame during the curing process. The apparatus is comprised of a center section with outer sections telescopically received in each of the outer ends of the center section. The center section and each outer section are provided with spaced-apart aligned apertures permitting the insertion of the stems of suction cups therethrough. The suction cups grippingly engaging the new window and hold same in place against the window frame. A tie-down clamp is attached to the end of each of the outer sections and engages either the frame of a pop-out window, if present, in the truck cab or the frame of the truck door. The overall length of the tie-down clamp is adjustable permitting the suction cups to compress the new window against the window frame and to hold same in place while the urethane seal therebetween is curing.

BRIEF DESCRIPTION OF THE DRAWINGS

The single FIGURE of the drawings is a perspective view of the window retaining apparatus of the present invention.

DESCRIPTION OF THE PREFERRED EMBODIMENT

Referring now to the single FIGURE of the drawings, the window retaining apparatus 10 of the present invention is illustrated. The window retaining apparatus 10 is comprised of a center tubular section 12 with a telescoping outer section 14 received within each of the oppositely disposed ends of center tubular section 12. Spaced-apart, oppositely disposed, aligned apertures 16 are provided in the center tubular section 12 and are alignable with similar apertures (not shown) in the outer sections 14. A rubber suction cup 18 is attached to the end of a stem 20 which is received through an aperture 16 provided within the center tubular section 12 and an aligned aperture in the outer section 14. The stem 20 of a suction cup 18 is received through an aperture 16 provided adjacent one end of center tubular section 12, while the stem 20 of another suction cup 18 is received through an aperture 16 provided adjacent the other end of center tubular section 12. One end 22 of a tie-down clamp 24 is received through an aperture 26 provided adjacent the outer end of each outer section 14. End 22 of tie-down clamp 24 is threaded and a nut 28 is provided oil opposite sides of outer section 14 adjacent each aperture 26 to lockingly retain the tie-down clamp 24 to the outer section 14. The opposite end 30 of the tie-down clamp 24 is curved into an approximate semi-circular configuration.

The center tubular section 12 can be fabricated from any one of a number of materials, such as steel, aluminum, plastic, fiber glass, etc. The outer sections 14 can be formed from similar material. In addition, the outer sections 14 can be formed from either tubular stock or bar stock. In any event, the approximate length of the outer sections 14 should be less than one-half of the length of the center tubular section 12 allowing a telescoping relationship to exist between each outer section 14 and the center of tubular section 12. In addition, the apertures 16 in the center tubular section 12 and the apertures in each of the outer sections 14 should be spaced apart such that the overall length of the window retaining apparatus 10 can be adjusted through a relatively wide range.

When the rear window of a truck is to be replaced, the new window is set into the window frame for same, and the overall length of the window retaining apparatus 10 is adjusted so that the curved end 30 of the tie-down clamps 24 can engage the frame of a pop-out window, if present, on the truck cab or the truck door frame. If the door frame is to be engaged, a longer tie-down clamp 24 may be required. Two rubber suction cups 20 are then positioned in a spaced apart relationship and the stems 18 for same are received through the apertures 16 in the center tubular section 12 and aligned apertures in the outer sections 14. After the suction cups 20 engage the window and the curved end 30 of the tie-down clamp 24 engages either the window frame or the door frame, each tie-down clamp 24 is tightened within its associated outer section 14 and locked in place by nuts 28 engaging the opposite sides of the outer section 14. In this manner, the window is held in place and compressed against the window frame while the urethane seal therebetween is curing. The curing process typically takes approximately twenty to thirty minutes to complete. By utilizing the window retaining apparatus 12 of the present invention, the window does not have to be manually held in place during the curing process.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. Apparatus for securing a window in place within a window frame while the seal therebetween is curing comprising a center tubular section having a plurality of spaced-apart aligned apertures therein, an outer end telescopically received within each of the oppositely disposed ends of said center section, means received within said spaced-apart aligned apertures within said center section, to grippingly engage the window, and means for retaining said apparatus in place during the curing process, said retaining means being operatively connected to each of said oppositely disposed ends of said outer sections and comprising a J-shaped hook member having an end thereof received through said end of said outer section, the end of said J-shaped hook member being threaded, and a fastener which threadingly engages said threaded end of said J-shaped hook member permitting said apparatus to compress the window against the window frame while the seal therebetween is curing.

2. The apparatus as defined in claim 1 wherein said means to grippingly engage the window comprises at least one suction cup.

* * * * *